United States Patent [19]
Aoki et al.

[11] Patent Number: 6,113,843
[45] Date of Patent: Sep. 5, 2000

[54] PROCESS FOR PREPARATION OF OXIDE MAGNETIC COMPACT

[75] Inventors: Takuya Aoki; Taku Murase; Kazuhiro Takakura; Jun Sawai; Naoyoshi Sato, all of Tokyo, Japan

[73] Assignee: TDK Corporation, Tokyo, Japan

[21] Appl. No.: 09/274,931

[22] Filed: Mar. 23, 1999

[30] Foreign Application Priority Data

May 27, 1998 [JP] Japan ................................. 10-162902

[51] Int. Cl.$^7$ ..................................... C04B 35/26
[52] U.S. Cl. ........................... 264/613; 264/611; 264/612
[58] Field of Search ..................................... 264/611, 612, 264/613

[56] References Cited

U.S. PATENT DOCUMENTS

| | | | |
|---|---|---|---|
| 4,097,392 | 6/1978 | Goldman et al. | 264/613 |
| 4,282,302 | 8/1981 | Makino et al. | |
| 4,846,987 | 7/1989 | Togane | |

FOREIGN PATENT DOCUMENTS 747292  11/1966  Canada ................................. 264/613

3-66254  10/1991  Japan .

OTHER PUBLICATIONS

Derwent Abstracts, Derwent Publications Ltd., AN 88–327701 and JP 63 242931, Oct. 7, 1988.

*Primary Examiner*—James Derrington
*Attorney, Agent, or Firm*—Oblon, Spivak, McClelland, Maier & Neustadt, P.C.

[57] ABSTRACT

The process for the preparation of an oxide magnetic compact of the invention comprises:

a step of preparing a mixed material which comprises 44 to 50 mole % of iron calculated as $Fe_2O_3$, 0.1 to 8 mole % of manganese calculated as $Mn_2O_3$, with the sum of iron and manganese being 50 to 54 mole % calculated as $Fe_2O_3$ and $Mn_2O_3$, 20 to 38 mole % of magnesium calculated as MgO, 17 to 22 mole % of zinc calculated as ZnO and not more than 5 mole % of copper calculated as CuO, and a step of molding the aforesaid mixed material to a predetermined shape and then firing it in an atmosphere of low oxygen concentration of 2.5 to 12% by volume. Therefore, there appears an extremely excellent effect that the oxide magnetic compact having excellent electromagnetic properties can be obtained at low cost.

4 Claims, No Drawings

PROCESS FOR PREPARATION OF OXIDE MAGNETIC COMPACT

BACKGROUND OF THE INVENTION (i) Technical Field of the Invention

The present invention relates to a process for the preparation of an oxide magnetic compact used for magnetic core materials, particularly, for example, deflecting yoke cores for a cathode ray tube (CRT).

(ii) Description of the Prior Art

Private TV's have been passing into high-vision TV's. High accuracy and high minuteness are strongly needed for a display of personal computers. Therefore, for example, in a deflecting yoke core which is inserted into these TV's, there is a need of dealing with high frequencies and high electric currents. When high electric currents are used, considerably high electric currents are passed in the deflecting yoke core and, therefore, high magnetic flux density of, for example, not less than 160 mT becomes an important factor in order to avoid the production of magnetic saturation in small volume. Exothermic problems occur because core-loss is high in high frequencies. Consequently, it is important that the core-loss is low, for example, not more than 80 kW/m$^3$. It is also needed that Curie point is sufficient high, for example, at least 140° C. The core resistivity of at least 10$^6$ Ω·cm is used because vertical stripes due to a ringing phenomenon occur on a CRT screen when the core resistivity is low. In the case of a toroidal coil, it is important that the core resistivity is high because of the need of enhancing the insulation between coils.

Mg—Zn type ferrite has been used for a deflecting yoke core because its price is low. In addition, there has been used widely Mn—Mg—Zn ferrite in which $Mn_2O_3$ is added to the Mg—Zn ferrite in order to obtain low loss and high resistance. This is disclosed in Japanese Patent Application Laid-Open No. Hei-3-66254.

The price-lowering trend in electronic apparatuses has been promoted. It is also needed for soft ferrite used for electronic parts that their price is lowered. In order to realize the price-lowering, it has been desired to reconsider the firing conditions in a low oxygen concentration atmosphere, which has been negatively used because deterioration occurs on properties of the products, and to set a mixed material's composition so as to match the firing conditions in a low oxygen concentration atmosphere.

SUMMARY OF THE INVENTION

In such a situation, the present invention has been originated. A purpose of the invention is to provide a process for the preparation of an oxide magnetic compact, MnMgZn type ferrite, which can be prepared at low cost and has excellent electromagnetic properties such as high magnetic flux density, low loss and high resistance, etc.

In order to solve these problems, the present process for the preparation of an oxide magnetic compact comprises:

a step of preparing a mixed material which comprises 44 to 50 mole % of iron calculated as $Fe_2O_3$, 0.1 to 8 mole % of manganese calculated as $Mn_2O_3$, with the sum of iron and manganese being 50 to 54 mole % calculated as $Fe_2O_3$ and $Mn_2O_3$, 20 to 38 mole % of magnesium calculated as MgO, 17 to 22 mole % of zinc calculated as ZnO and not more than 5 mole % of copper calculated as CuO, and a step of molding the aforesaid mixed material and then firing it in an atmosphere of low oxygen concentration of 2.5 to 12% by volume.

In a preferred embodiment of the invention, the firing in the aforesaid firing step is carried out in an atmosphere of low oxygen concentration of 3 to 10% by volume.

In a preferred embodiment of the invention, a value of $Mn^{3+}/Mn$ in the oxide magnetic compact fired in the low oxygen concentration atmosphere mentioned above is not less than 45%.

In a preferred embodiment of the invention, the aforesaid oxide magnetic compact is a deflecting yoke core.

DETAILED DESCRIPTION OF THE INVENTION

Practical embodiments of the invention will be described below.

One of the characteristics of the invention is that the oxide magnetic compact having a predetermined composition in which each component is mixed in a predetermined ratio is fired in an atmosphere of low oxygen concentration within a predetermined range. In the present invention, only when both the predetermined composition and the predetermined firing conditions are satisfied, the present effects appear remarkably. This will be specifically described below.

The present process for the preparation of an oxide magnetic compact comprises:

a step of preparing a mixed material which comprises 44 to 50 mole % of iron calculated as $Fe_2O_3$, 0.1 to 8 mole % of manganese calculated as $Mn_2O_3$, with the sum of iron and manganese being 50 to 54 mole % calculated as $Fe_2O_3$ and $Mn_2O_3$, 20 to 38 mole % of magnesium calculated as MgO, 17 to 22 mole % of zinc calculated as ZnO and not more than 5 mole % of copper calculated as CuO, and a step of molding the aforesaid mixed material to a predetermined shape and then firing it in an atmosphere of low oxygen concentration of 2.5 to 12% by volume.

In the aforesaid mixed material, an amount of iron is 44 to 50 mole %, preferably 46 to 49.5 mole %, calculated as $Fe_2O_3$; an amount of manganese is 0.1 to 8 mole %, preferably 1 to 7 mole %, calculated as $Mn_2O_3$; and the sum of iron and manganese is 50 to 54 mole %, preferably 50.1 to 53 mole %, calculated as $Fe_2O_3$ and $Mn_2O_3$.

In the present invention, it is required that the sum of iron and manganese ($Fe_2O_3+Mn_2O_3$) is within the aforesaid range in order to obtain excellent properties of ferrite such as high magnetic flux density, low loss and high resistance. If the sum of iron and manganese ($Fe_2O_3+Mn_2O_3$) is less than 50 mole %, loss increases, resistivity decreases and magnetic flux density decreases in the case where the firing is carried out in an atmosphere of the low oxygen concentration defined according to the invention the invention which will be described below. If the sum of iron and manganese ($Fe_2O_3+Mn_2O_3$) exceeds 54 mole %, resistivity decreases and loss increases, regardless of oxygen concentration in a firing atmosphere. Accordingly, there are fears such as a waste of electric power consumed in deflection circuits and a temperature elevation when used as a deflection yoke core.

If the amount of iron is less than 44 mole % calculated as $Fe_2O_3$, Curie point and magnetic flux density tend to decrease, while if it exceeds 50 mole %, resistivity decreases.

As mentioned above, an amount of manganese is 0.1 to 8 mole %, preferably 1 to 7 mole %, calculated as $Mn_2O_3$. If the amount is less than 0.1 mole, loss increases, while if it exceeds 8 mole %, the amount of $Fe_2O_3$ corresponding to the excess decreases and, therefore, magnetic flux density decreases.

Because the aforesaid stoichiometric composition of the sum of iron and manganese ($Fe_2O_3+Mn_2O_3$) is an unequivocal factor which determines the properties, MgO mainly plays a supplementary role for maintaining the sum of iron and manganese and, therefore, magnesium is contained in an amount of 20 to 38 mole % calculated as MgO. ZnO also plays a supplementary role like MgO and, furthermore, may affect the properties such as Curie point and core-loss. Accordingly, an amount of zinc is 17 to 22 mole %, preferably 18 to 21 mole %, calculated as ZnO. If the amount exceeds 22 mole %, Curie point tends to decrease. If it is less than 17 mole %, there appears a disadvantage that core-loss increases.

In addition, it is preferred that the oxide magnetic compact prepared according to the invention further contains copper in an amount of not more than 5 mole %, more preferably 1 to 3 mole %, calculated as CuO. If the amount exceeds 5 mole %, there appears a disadvantage that growth of irregular particles is enhanced and, therefore, core-loss increases in the case where the firing is carried out in an atmosphere of the low oxygen concentration defined according to the present invention.

Raw materials of iron, manganese, magnesium, zinc and copper are not restricted to particular ones as long as they can be obtained as an oxide after reacted. In addition to the oxides, any compound such as metal simple substances, carbonates, hydroxides, halides, etc. may be used according to the reaction conditions.

The raw materials for the oxide magnetic compact having a predetermined composition in which the aforesaid ingredients are blended in a predetermined ratio are mixed with each other to obtain a mixed material having a predetermined composition (a step of preparing a mixed material).

Subsequently, calcination and ground are carried out as a general manner for the preparation of ferrite. The product is then kneaded with the binder added to produce particles. At a proper time, this molding compound is compression molded using a mold into a predetermined shape and then fired. In the present invention, oxygen concentration in this firing process is set to be low oxygen concentration of 2.5 to 12% by volume, preferably 3 to 10% by volume, more preferably 3 to 5% by volume. The firing in such a low oxygen concentration atmosphere makes it possible to prepare an oxide magnetic compact (MnMgZn type ferrite) having excellent electromagnetic properties, i.e. ferrite properties such as high magnetic flux density, low loss and high resistance. In addition, it may be realized effectively to lower the preparation cost because such a low oxygen concentration atmosphere may be produced inexpensively. If the oxygen concentration is less than 2.5% by volume, improvement of ferrite properties does not appear, while if the oxygen concentration exceeds 12% by volume, improvement of ferrite properties does not appear and, moreover, cost for maintaining the oxygen concentration atmosphere is high. In the aforesaid low oxygen concentration atmosphere, a firing temperature of 1250 to 1350° C. and a firing time of 1 to 4 hours are used.

It is preferred that a value of $Mn^{3+}/Mn$ in the oxide magnetic compact fired in the low oxygen concentration atmosphere according to the present invention is at least 45%. The upper limit is 100%. The larger the value is, the higher the resistivity is. The larger resistivity is preferable. If a value of $Mn^{3+}/Mn$ is less than 45%, there appears a disadvantage that the resistivity is low. Therefore, in the present process, it is preferred that the firing is carried out in the low oxygen concentration atmosphere using the conditions which make a value of $Mn^{3+}/Mn$ in the oxide magnetic compact be not less than 45%. A value of $Mn^{3+}/Mn$ indicates a ratio of $Mn^{3+}$ to the total Mn, that is, $Mn^{3+}+Mn^{2+}$. In the determination of $Mn^{3+}$, analysis of $Mn^{3+}$ was carried out as follows:

Method for Analyzing $Mn^{3+}$

About 0.2 g of ferrite powder is weighed accurately in a 300 ml flask. 20 ml of strong phosphoric acid is added to this flask while passing nitrogen gas. This flask is shaken well and heated to dissolve the powder. The solution thus obtained is cooled to approximately room temperature to which 100 ml of water are then added. A 1/20 N solution of iron (II) ammonium sulfate is added to this solution to change its color from purplish red to colorless. After the purplish red disappears, excess 10 ml of the solution of iron (II) ammonium sulfate is further added. A back titration is carried out with a 1/20 N standard solution of potassium bichromate using diphenylaluminium sodium sulfonate as an indicator. At the end point, the color is changed from colorless to purplish blue. A point where purplish blue does not disappear for at least one minute is determined to be the end point. A concentration of $Mn^{3+}$ is calculated in the following formula (I):

$$Mn^{3+}(wt. \%)=[(a-b) \times 2.7469/\text{ferrite powder (mg)}] \times 100 \quad (I)$$

In the aforesaid formula (I), a is an amount of the solution of iron (II) ammonium sulfate added dropwise in ml; and b is an amount of potassium bichromate added dropwise in ml.

EXAMPLES

The present invention will be further specifically explained below by showing concrete examples.

(Preparation of Samples for Examinations)

As indicated in Table 1 below, $Fe_2O_3$, $Mn_2O_3$, MgO, ZnO and CuO were blended in a predetermined ratio and then wet blended in a ball mill for 16 hours. After calcined at 900° C. for 3 hours, the calcined powder was further wet ground in a ball mill for 16 hours. A solution of polyvinyl alcohol was added in an amount of 10% by weight to the resultant ferrite powder which was then granulated. The granules were compression molded under a pressure of 1 ton/cm² to a toroidal form.

These samples were fired at a temperature of 1300° C. for 3 hours in an atmosphere of oxygen concentration of 0.5 to 21% (air) by volume as shown in Table 1 below to obtain various molded products. After fired, as electromagnetic properties, core-loss, saturated magnetic flux density, Bs, resistivity and Curie point were determined on the samples thus obtained. Now, core-loss is indicated as a value determined according to JIS C 2561-1992 at 100° C., 64 kHz and 50 mT.

The results are as shown in Table 1 below.

TABLE 1

| Sample | Oxygen concentration in firing, (%) | ferrite composition, (mole %) | | | | | $(Fe_2O_3 + Mn_2O_3)$ | Core-loss, (kW/m³) | Bs (mT) | Resistivity, (Ωcm) | Curie Tem. (° C.) |
|---|---|---|---|---|---|---|---|---|---|---|---|
| | | $Fe_2O_3$ | $Mn_2O_3$ | MgO | ZnO | CuO | | | | | |
| A1 | 21 (Air) | 46.6 | 2.9 | 29.6 | 20.9 | 0 | 49.5 | 63 | 165 | $10^9$ | 134 |
| A2 | 5 | 46.6 | 2.9 | 29.6 | 20.9 | 0 | 49.5 | 83 | 168 | $10^8$ | 134 |
| B1 | 21 (Air) | 47.3 | 2.9 | 28.9 | 20.8 | 0 | 50.3 | 70 | 175 | $10^8$ | 141 |
| B2* | 5 | 47.3 | 2.9 | 28.9 | 20.8 | 0 | 50.3 | 62 | 174 | $10^8$ | 141 |
| C1 | 21 (Air) | 48.1 | 2.9 | 28.2 | 20.8 | 0 | 51.0 | 83 | 184 | $10^7$ | 147 |
| C2* | 5 | 48.1 | 2.9 | 28.2 | 20.8 | 0 | 51.0 | 73 | 185 | $10^6$ | 147 |

TABLE 1-continued

| Sample | Oxygen concentration in firing, (%) | ferrite composition, (mole %) | | | | | $(Fe_2O_3 + Mn_2O_3)$ | Core-loss, $(kW/m^3)$ | Bs (mT) | Resistivity, $(\Omega cm)$ | Curie Tem. (° C.) |
|---|---|---|---|---|---|---|---|---|---|---|---|
| | | $Fe_2O_3$ | $Mn_2O_3$ | MgO | ZnO | CuO | | | | | |
| D1 | 21 (Air) | 51.2 | 2.0 | 26.4 | 20.4 | 0 | 53.2 | 120 | 229 | $10^4$ | 173 |
| D2 | 5 | 51.2 | 2.0 | 26.4 | 20.4 | 0 | 53.2 | 112 | 226 | $10^4$ | 173 |
| E1 | 21 (Air) | 47.2 | 7.1 | 25.3 | 20.4 | 0 | 54.3 | 72 | 161 | $10^5$ | 162 |
| E2 | 5 | 47.2 | 7.1 | 25.3 | 20.4 | 0 | 54.3 | 70 | 158 | $10^5$ | 162 |
| F1 | 21 (Air) | 51.0 | 0 | 28.4 | 20.6 | 0 | 51.0 | 148 | 215 | $10^2$ | 178 |
| F2 | 5 | 51.0 | 0 | 28.4 | 20.6 | 0 | 51.0 | 143 | 215 | $10^2$ | 178 |
| G1 | 21 (Air) | 42.5 | 7.6 | 30.3 | 19.6 | 0 | 50.1 | 42 | 135 | $10^8$ | 125 |
| G2 | 5 | 42.5 | 7.6 | 30.3 | 19.6 | 0 | 50.1 | 39 | 132 | $10^8$ | 125 |
| H1 | 21 (Air) | 49.2 | 1.0 | 29.1 | 20.7 | 0 | 50.2 | 72 | 180 | $10^6$ | 151 |
| H2* | 5 | 49.2 | 1.0 | 29.1 | 20.7 | 0 | 50.2 | 59 | 179 | $10^6$ | 151 |
| I1 | 21 (Air) | 45.0 | 8.2 | 26.4 | 20.4 | 0 | 53.2 | 45 | 145 | $10^7$ | 147 |
| I2 | 5 | 45.0 | 8.2 | 26.4 | 20.4 | 0 | 53.2 | 43 | 140 | $10^7$ | 147 |
| J1 | 21 (Air) | 47.6 | 3.0 | 26.4 | 21.0 | 2.1 | 50.6 | 56 | 173 | $10^8$ | 146 |
| J2* | 5 | 47.6 | 3.0 | 26.4 | 21.0 | 2.1 | 50.6 | 51 | 173 | $10^8$ | 146 |
| K1 | 21 (Air) | 47.5 | 3.0 | 22.5 | 21.0 | 6.0 | 50.5 | 92 | 208 | $10^8$ | 163 |
| K2 | 5 | 47.5 | 3.0 | 22.5 | 21.0 | 6.0 | 50.5 | 132 | 203 | $10^7$ | 163 |
| L1 | 21 (Air) | 48.5 | 2.0 | 27.3 | 22.2 | 0 | 50.5 | 60 | 145 | $10^6$ | 135 |
| L2 | 5 | 48.5 | 2.0 | 27.3 | 22.2 | 0 | 50.5 | 55 | 143 | $10^6$ | 135 |
| M1 | 21 (Air) | 47.6 | 3.0 | 29.0 | 19.4 | 1.0 | 50.6 | 82 | 195 | $10^8$ | 157 |
| M2 | 15 | 47.6 | 3.0 | 29.0 | 19.4 | 1.0 | 50.6 | 81 | 198 | $10^8$ | 157 |
| M3* | 10 | 47.6 | 3.0 | 29.0 | 19.4 | 1.0 | 50.6 | 70 | 197 | $10^8$ | 157 |
| M4* | 5 | 47.6 | 3.0 | 29.0 | 19.4 | 1.0 | 50.6 | 68 | 198 | $10^7$ | 157 |
| M5* | 3 | 47.6 | 3.0 | 29.0 | 19.4 | 1.0 | 50.6 | 67 | 196 | $10^6$ | 157 |
| M6 | 1 | 47.6 | 3.0 | 29.0 | 19.4 | 1.0 | 50.6 | 80 | 196 | $10^6$ | 157 |
| M7 | 0.5 | 47.6 | 3.0 | 29.0 | 19.4 | 1.0 | 50.6 | 88 | 195 | $10^6$ | 157 |
| N1 | 21 (Air) | 48.5 | 2.0 | 27.5 | 22.0 | 0 | 50.5 | 71 | 171 | $10^7$ | 141 |
| N2* | 5 | 48.5 | 2.0 | 27.5 | 22.0 | 0 | 50.5 | 62 | 173 | $10^7$ | 141 |
| O1 | 21 (Air) | 47.6 | 2.9 | 32.5 | 17.0 | 0 | 50.4 | 95 | 208 | $10^8$ | 188 |
| O2* | 5 | 47.6 | 2.9 | 32.5 | 17.0 | 0 | 50.4 | 88 | 211 | $10^7$ | 188 |
| P1 | 21 (Air) | 47.5 | 2.9 | 34.6 | 15.0 | 0 | 50.4 | 125 | 220 | $10^8$ | 202 |
| P2 | 5 | 47.5 | 2.9 | 34.6 | 15.0 | 0 | 50.4 | 123 | 223 | $10^7$ | 202 |
| Q1 | 21 (Air) | 49.6 | 0.5 | 28.9 | 21.0 | 0 | 50.1 | 81 | 183 | $10^6$ | 142 |
| Q2* | 5 | 49.6 | 0.5 | 28.9 | 21.0 | 0 | 50.1 | 76 | 182 | $10^6$ | 142 |

In Table 1, the samples marked with * are within the present invention. These samples of the invention exhibit high Bs values of saturated magnetic flux density, low core-loss and practically sufficient values of Curie point and resistivity, while other samples, that is, comparative samples have various problems. In Samples A1 and A2 where a value of $Fe_2O_3+Mn_2O_3$ is less than 50 mole %, the saturated magnetic flux density is low in either case. In such a composition, if fired in a low oxygen concentration atmosphere, as in the case of Sample A2, the core-loss further increases and the resistivity further decreases.

In Samples E1 and E2 where a value of $Fe_2O_3+Mn_2O_3$ exceeds 54 mole %, the resistivity is low in either case. In such a composition, if fired in a low oxygen concentration atmosphere, as in the case of Sample E2, particularly remarkable effects do not appear.

Similarly, in Samples D1 and D2 as well as Samples F1 and F2 where a value of $Fe_2O_3$ exceeds 50 mole %, the resistivity is extremely low in either case. In such a composition, if fired in a low oxygen concentration atmosphere, as in the case of Samples D2 and F2, particularly remarkable effects do not appear.

On the other hand, in Samples G1 and G2 where a value of $Fe_2O_3$ is less than 44 mole %, the Curie point and the saturated magnetic flux density, Bs, are low in either case. In such a composition, if fired in a low oxygen concentration atmosphere, as in the case of Sample G2, particularly remarkable effects do not appear.

In Samples I1 and I2 where an amount of $Mn_2O_3$ exceeds 8 mole %, the saturated magnetic flux density, Bs, is low in either case. In such a composition, if fired in a low oxygen concentration atmosphere, as in the case of Sample I2, particularly remarkable effects do not appear.

In Samples K1 and K2 where an amount of CuO exceeds 5 mole %, the core-loss increases in either case. Particularly in Sample K2 which was fired in low oxygen concentration atmosphere, a degree of this deterioration is remarkably high.

In Samples L1 and L2 where an amount of ZnO exceeds 22 mole %, the Curie point is low in either case. In such a composition, if fired in a low oxygen concentration atmosphere, as in the case of Sample L2, particularly remarkable effects do not appear. Meanwhile, in Samples P1 and P2 where an amount of ZnO is less than 17 mole %, the core-loss extremely increases in either case. In such a composition, if fired in a low oxygen concentration atmosphere, as in the case of Sample P2, particularly remarkable effects do not appear.

Samples M1 to M7 have the same composition as each other and each of them satisfies one of the requirements of the present invention. Only Samples M3, M4 and M5, which satisfy the requirement that the firing is carried out in an atmosphere of low oxygen concentration of 2.5 to 12% by volume, exhibit extremely good electromagnetic properties.

A comparison of electromagnetic properties is carried out between Samples B1 and B2 (present invention), between Samples C1 and C2 (present invention), between Samples H1 and H2 (present invention), between Samples J1 and J2 (present invention), between Samples N1 and N2 (present invention), between Samples O1 and O2 (present invention), and between Samples Q1 and Q2 (present invention). As a result, it is found that the samples having a predetermined composition according to the invention exhibit excellent effects when fired in a low oxygen concentration atmosphere.

Next, in Table 2 below are shown values of $M^{3+}/Mn$ in the oxide magnetic compacts obtained according to the invention.

TABLE 2

| Sample | Oxygen concentration in firing, (%) | ferrite composition, (mole %) | | | | | | |
|---|---|---|---|---|---|---|---|---|
| | | $Fe_2O_3$ | $Mn_2O_3$ | MgO | ZnO | CuO | $(Fe_2O_3 + Mn_2O_3)$ | $Mn^{3+}/Mn$ (%) |
| B2* | 5 | 47.3 | 2.9 | 28.9 | 20.8 | 0 | 50.3 | 74 |
| C2* | 5 | 48.1 | 2.9 | 28.2 | 20.8 | 0 | 51.0 | 63 |
| D2 | 5 | 51.2 | 2.0 | 26.4 | 20.4 | 0 | 53.2 | 2 |
| E2 | 5 | 47.2 | 7.1 | 25.3 | 20.4 | 0 | 54.3 | 35 |
| H2* | 5 | 49.2 | 1.0 | 29.1 | 20.7 | 0 | 50.2 | 46 |
| J2* | 5 | 47.6 | 3.0 | 26.4 | 21.0 | 2.1 | 50.6 | 70 |
| M3* | 10 | 47.6 | 3.0 | 29.0 | 19.4 | 1.0 | 50.6 | 70 |
| M4* | 5 | 47.6 | 3.0 | 29.0 | 19.4 | 1.0 | 50.6 | 68 |
| M5* | 3 | 47.6 | 3.0 | 29.0 | 19.4 | 1.0 | 50.6 | 64 |
| N2* | 5 | 48.5 | 2.0 | 27.5 | 22.0 | 0 | 50.5 | 62 |
| O2* | 5 | 47.6 | 2.9 | 32.5 | 17.0 | 0 | 50.4 | 58 |
| Q2* | 5 | 49.6 | 0.5 | 28.9 | 21.0 | 0 | 50.1 | 45 |

From the results in Table 2, it is found that a value of $M^{3+}/Mn$ is not less than 45% in Samples B2, C2 and H2 which are within the present invention.

A deflecting yoke core was practically prepared using the process of the invention and its electromagnetic properties were determined. Then, it was confirmed that very good properties were obtained.

From the results as mentioned above, the effects of the invention is apparent. That is, the present process comprises:

a step of preparing a mixed material which comprises 44 to 50 mole % of iron calculated as $Fe_2O_3$, 0.1 to 8 mole % of manganese calculated as $Mn_2O_3$, with the sum of iron and manganese being 50 to 54 mole % calculated as $Fe_2O_3$ and $Mn_2O_3$, 20 to 38 mole % of magnesium calculated as MgO, 17 to 22 mole % of zinc calculated as ZnO and not more than 5 mole % of copper calculated as CuO, and a step of molding the aforesaid mixed material to a predetermined shape and then firing it in an atmosphere of low oxygen concentration of 2.5 to 12% by volume and, therefore, there appears an extremely excellent effect that the oxide magnetic compact having excellent electromagnetic properties can be obtained at low cost.

What is claimed is:

1. A process for the preparation of an oxide magnetic compact, characterized in that the process comprises:

a step of preparing a mixed material which comprises 44 to 50 mole % of iron calculated as $Fe_2O_3$, 0.1 to 8 mole % of manganese calculated as $Mn_2O_3$, with the sum of iron and manganese being 50 to 54 mole % calculated as $Fe_2O_3$ and $Mn_2O_3$, 20 to 38 mole % of magnesium calculated as MgO, 17 to 22 mole % of zinc calculated as ZnO and not more than 5 mole % of copper calculated as CuO, and a step of molding the aforesaid mixed material to a predetermined shape and then firing it in an atmosphere of low oxygen concentration of 2.5 to 12% by volume.

2. The process claimed in claim 1, wherein the firing in said firing step is carried out in an atmosphere of low oxygen concentration of 3 to 10% by volume.

3. The process claimed in claim 1, wherein a value of $Mn^{3+}/Mn$ in the oxide magnetic compact fired in said low oxygen concentration atmosphere is at least 45%.

4. The process claimed in claim 1, wherein said oxide magnetic compact is a deflecting yoke core.

* * * * *